(12) United States Patent
Creedon et al.

(10) Patent No.: US 10,896,176 B1
(45) Date of Patent: Jan. 19, 2021

(54) MACHINE LEARNING BASED QUERY OPTIMIZATION FOR FEDERATED DATABASES

(71) Applicant: EMC IP Holding Company LLC, Hopkinton, MA (US)

(72) Inventors: Sean Creedon, Ballincollig (IE); Ian Gerard Roche, Glanmire (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 246 days.

(21) Appl. No.: 15/897,636

(22) Filed: Feb. 15, 2018

(51) Int. Cl.
*G06F 16/2453* (2019.01)
*G06N 20/00* (2019.01)
*G06F 16/21* (2019.01)
*G06F 16/25* (2019.01)
*G06F 16/2455* (2019.01)

(52) U.S. Cl.
CPC ...... *G06F 16/24542* (2019.01); *G06F 16/211* (2019.01); *G06F 16/2455* (2019.01); *G06F 16/256* (2019.01); *G06N 20/00* (2019.01)

(58) Field of Classification Search
CPC ............... G06F 16/24542; G06F 17/30; G06F 16/24545
USPC .................................................. 707/718, 713
See application file for complete search history.

(56) References Cited

U.S. PATENT DOCUMENTS

| | | | | |
|---|---|---|---|---|
| 10,489,402 | B2 * | 11/2019 | Li | G06F 16/24553 |
| 10,540,355 | B1 * | 1/2020 | Agnich | G06F 16/24542 |
| 2006/0224551 | A1 * | 10/2006 | Lariba-Pey | G06F 16/2456 |
| 2010/0114865 | A1 * | 5/2010 | Gupta | G06F 16/24542 |
| | | | | 707/713 |
| 2010/0125565 | A1 * | 5/2010 | Burger | G06F 16/24524 |
| | | | | 707/713 |
| 2011/0010346 | A1 * | 1/2011 | Goldenberg | G06F 16/2471 |
| | | | | 707/690 |
| 2011/0231708 | A1 * | 9/2011 | Lawrance | G06F 11/3664 |
| | | | | 714/38.1 |
| 2014/0280032 | A1 * | 9/2014 | Kornacker | G06F 16/2471 |
| | | | | 707/718 |
| 2015/0169686 | A1 * | 6/2015 | Elias | G06F 16/24542 |
| | | | | 707/718 |
| 2017/0371926 | A1 * | 12/2017 | Shiran | G06F 16/24542 |
| 2018/0218038 | A1 * | 8/2018 | Katahira | G06F 16/24542 |
| 2019/0188313 | A1 * | 6/2019 | Bansal | G06F 16/2471 |
| 2019/0236184 | A1 * | 8/2019 | Dvinov | G06F 16/24532 |

* cited by examiner

*Primary Examiner* — Giovanna B Colan
(74) *Attorney, Agent, or Firm* — Ryan, Mason & Lewis, LLP

(57) ABSTRACT

Techniques are provided for machine learning based query optimization for federated databases. An exemplary method comprises obtaining a query to be processed in a federated database; generating at least one predictive data movement instruction to move data to a target data source when the target data source satisfies one or more of a predefined efficiency criteria with respect to a query type of the query and a predefined capacity criteria at an expected execution time of the query; and generating a query execution plan for the query by calculating a cost of execution for a plurality of potential target data sources and selecting a target data source for the query based on the calculated cost of execution. The federated database optionally employs a dynamic federated query schema.

20 Claims, 10 Drawing Sheets

```
CREATE FOREIGN TABLE customer1 (
    id              char(5) NOT NULL,
    name            varchar(200) NOT NULL,
    date_created    date,
    type            varchar(10)
)
SERVER postgresql_server;

CREATE FOREIGN TABLE customer2 (
    id              char(5) NOT NULL,
    name            varchar(200) NOT NULL,
    date_created    date,
    type            varchar(10)
)
SERVER hive_server;

if xxxx then
    Select * from customer1;
else then
    Select * from customer2;
```

```
CREATE FOREIGN TABLE customer (
    id              char(5) NOT NULL,
    name            varchar(200) NOT NULL,
    date_created    date,
    type            varchar(10)
)
SERVER postgresql_server, hive_server;

Select * from customer;
```

MACHINE LEARNING BASED QUERY OPTIMIZATION FOR FEDERATED DATABASES

FIELD

The field relates generally to techniques for processing queries in federated databases.

BACKGROUND

Data federation techniques allow an enterprise to aggregate data in a virtual federated database from various sources so that the data can be analyzed, for example, using business intelligence techniques. The federated database contains metadata comprising information about the actual data and its location but the actual data is typically left in place in its original location. Existing data federation techniques employ static definitions that map a representation of the data in the federated database to the location of the original data.

Query optimizers analyze Structured Query Language queries and generate one or more query execution plans for each analyzed query. It is often difficult, however, to integrate federated databases with query optimizers.

A need therefore exists for improved techniques for optimizing queries performed in federated databases.

SUMMARY

Illustrative embodiments of the present disclosure provide techniques for machine learning based query optimization for federated databases. An exemplary method comprises: obtaining at least one query to be processed in a federated database; generating at least one predictive data movement instruction to move data to a target data source when the target data source satisfies one or more of a predefined efficiency criteria with respect to a query type of the at least one query and a predefined capacity criteria at an expected execution time of the at least one query; and generating a query execution plan for the at least one query by calculating a cost of execution for a plurality of potential target data sources and selecting a target data source for the at least one query based on the calculated cost of execution. In some embodiments, the federated database employs a dynamic federated query schema.

Other illustrative embodiments include, without limitation, apparatus, systems, methods and computer program products comprising processor-readable storage media.

BRIEF DESCRIPTION OF THE DRAWINGS

FIG. 3A illustrates exemplary pseudo code for creating external table links using a static federated schema;

FIG. 3B illustrates exemplary pseudo code for creating external table links for a table of data available in two different locations using a dynamic federated schema, according to an embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide machine learning based query optimization techniques for federated databases.

In one or more embodiments, predictive data movement instructions are generated to move data for a given query to a target data source when the target data source satisfies (i) a predefined efficiency criteria with respect to a query type of the given query, or (ii) a predefined capacity criteria at an expected execution time of the given query. In addition, a query execution plan is generated for the given query by calculating a cost of execution for a plurality of potential target data sources and selecting a target data source for the given query based on the calculated cost of execution.

Figure 1:
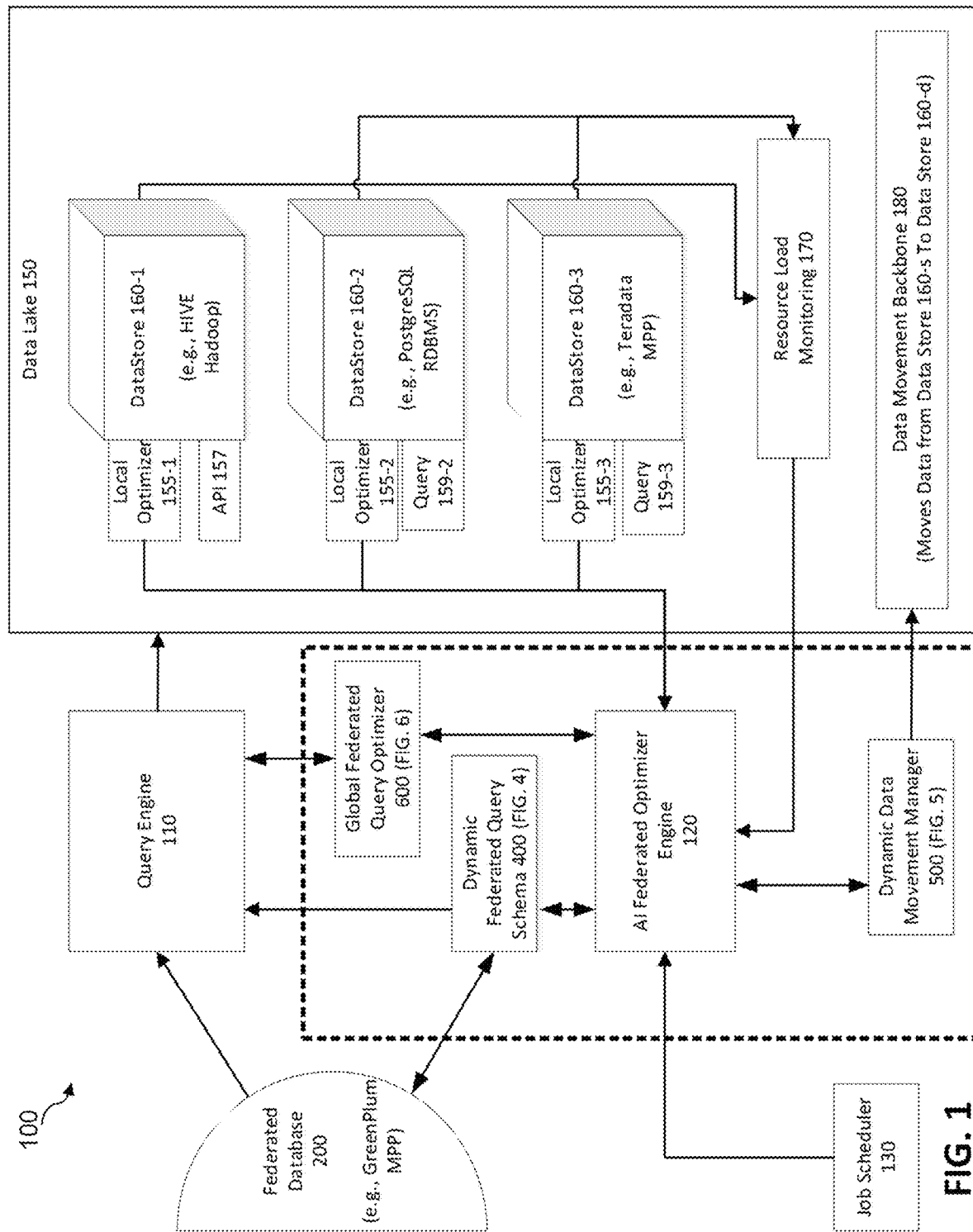
FIG. 1 illustrates an exemplary federated database query environment, according to an embodiment of the disclosure.

FIG. 1 illustrates an exemplary federated database query environment 100, according to an embodiment of the disclosure. As shown in FIG. 1, the exemplary federated database query environment 100 comprises a federated database 200, as discussed further below in conjunction with FIG. 2, such as a GreenPlum massively parallel processing (MPP) data warehouse. The exemplary federated database query environment 100 further comprises a query engine 110 that executes queries against a data lake 150.

In one or more embodiments of the disclosure, an artificial intelligence (AI) federated optimizer engine 120 interacts with a job scheduler 130 and coordinates a dynamic federated query schema 400, as discussed further below in conjunction with FIG. 4; a dynamic data movement manager 500, as discussed further below in conjunction with FIG. 5; and a global federated query optimizer 600, as discussed further below in conjunction with FIG. 6.

The exemplary data lake 150 comprises a plurality of data stores, such as data stores 160-1 through 160-3, each having a corresponding local optimizer 155-1 through 155-3. Data store 160-1 may be implemented, for example, as a Hive Hadoop data store utilizing an application programming interface 157, in a known manner.

Data store 160-2 may be implemented, for example, as a PostgreSQL relational database management system (RDBMS) utilizing a query interface 159-2, in a known manner. Data store 160-3 may be implemented, for example, as a Teradata MPP database utilizing a query interface 159-3, in a known manner.

A resource load monitoring module 170 monitors the load on the various data stores 160 and provides feedback to the AI federated optimizer engine 120, as discussed further below. As shown in FIG. 1, the exemplary data lake 150 further comprises a data movement backbone 180 that moves data from a source data store 160-*s* to a destination data store 160-*d*.

In some embodiments, the federated database query environment 100 employs a dynamic federated schema.

Figure 2:
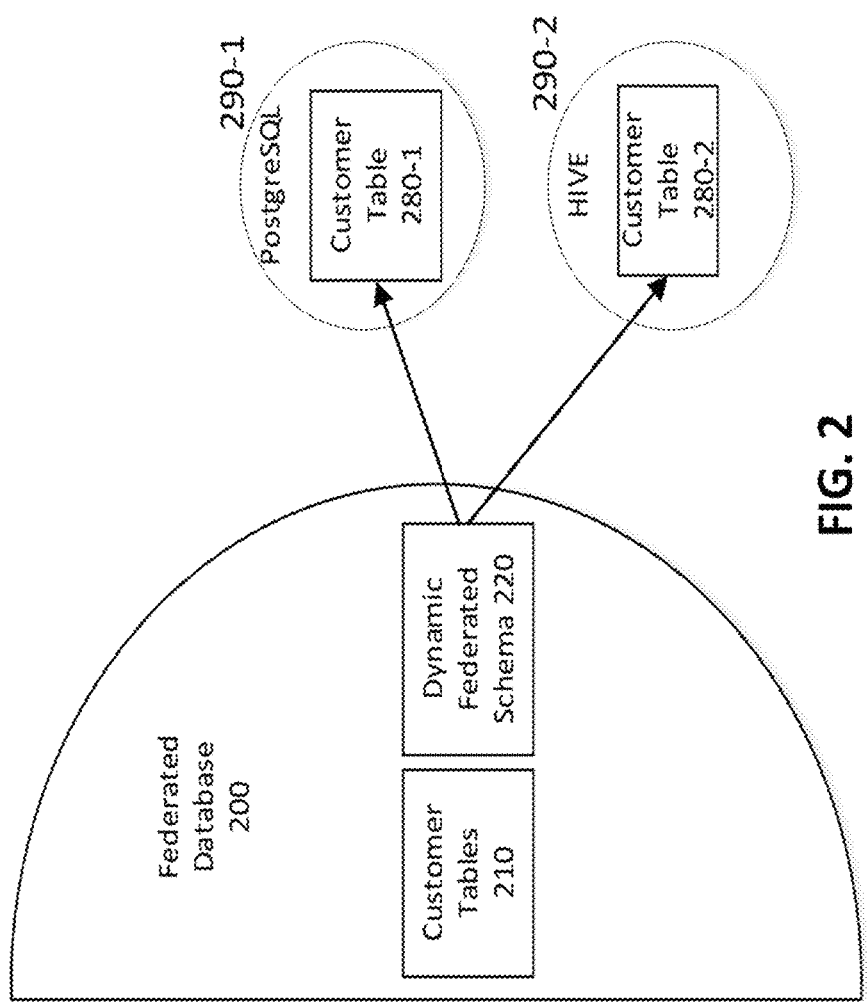
FIG. 2 illustrates the federated database of FIG. 1 in further detail, according to some embodiments.

FIG. 2 illustrates the federated database 200 of FIG. 1 in further detail, according to some embodiments. As shown in FIG. 2, the federated database 200 comprises customer tables 210 and a dynamic federated schema 220 that map to, for example, a customer table 280-1 on a data store PostgreSQL data store 290-1 and a customer table 280-2 on a HIVE data store 290-2.

Generally, as noted above, data federation techniques allow an enterprise to aggregate data in a virtual federated database from disparate sources so that the data can be used for business intelligence (BI) or other analysis. The virtual federated database 200 contains metadata comprising information about the actual data and its location in the customer tables 210 but does not include the actual data (the actual data is typically left in place in its original location on the data stores 290). Existing data federation techniques employ static definitions that map a representation of the data in the virtual federated database to the location of the original data.

In this manner, data federation technology aggregates data from disparate sources and formats with virtual database objects. The benefits of this technology include increased availability and reliability as well as improved access times for business and data analysis.

Data federation techniques allow multiple data file types, such as JSON (JavaScript Object Notation) files, DB2 data, XML, and Sybase data to be queried across the multiple sources in a single SQL statement.

In one or more embodiments, data federation (also referred to as External Tables) provides point to point links. However, in modern data lake systems it is very common to find multiple copies of data. FIG. 3A illustrates exemplary pseudo code 300 for creating external table links for a table of data available in two different locations, PostgreSQL and HIVE, using a static federated schema. The existing approach of FIG. 3A manually creates a link to one of these data sources from the federation capable database to allow the data to be used in regular SQL queries. As shown in the pseudo code 300 of FIG. 3A, the user has to build logic to decide which federated table to use, to create the external table links and a sample query on a federated database without the dynamic federated schema provided by aspects of the present invention.

FIG. 3B illustrates exemplary pseudo code 350 for creating external table links for a table of data available in two different locations, PostgreSQL and HIVE, using a dynamic federated schema, according to an embodiment of the disclosure. With the disclosed dynamic schema, the AI federated optimizer engine 120 makes the decision for the user and the user query is greatly simplified. As the decision is left to the database and query optimizer to decide what actual external data is used in the user query, additional external table links can be dynamically added without impacting the user query.

As noted above, the exemplary AI federated optimizer engine 120 processes information that can be used to generate information that the other components of the solution can use to operate, as discussed further below in conjunction with FIGS. 4 through 6.

Figure 4:
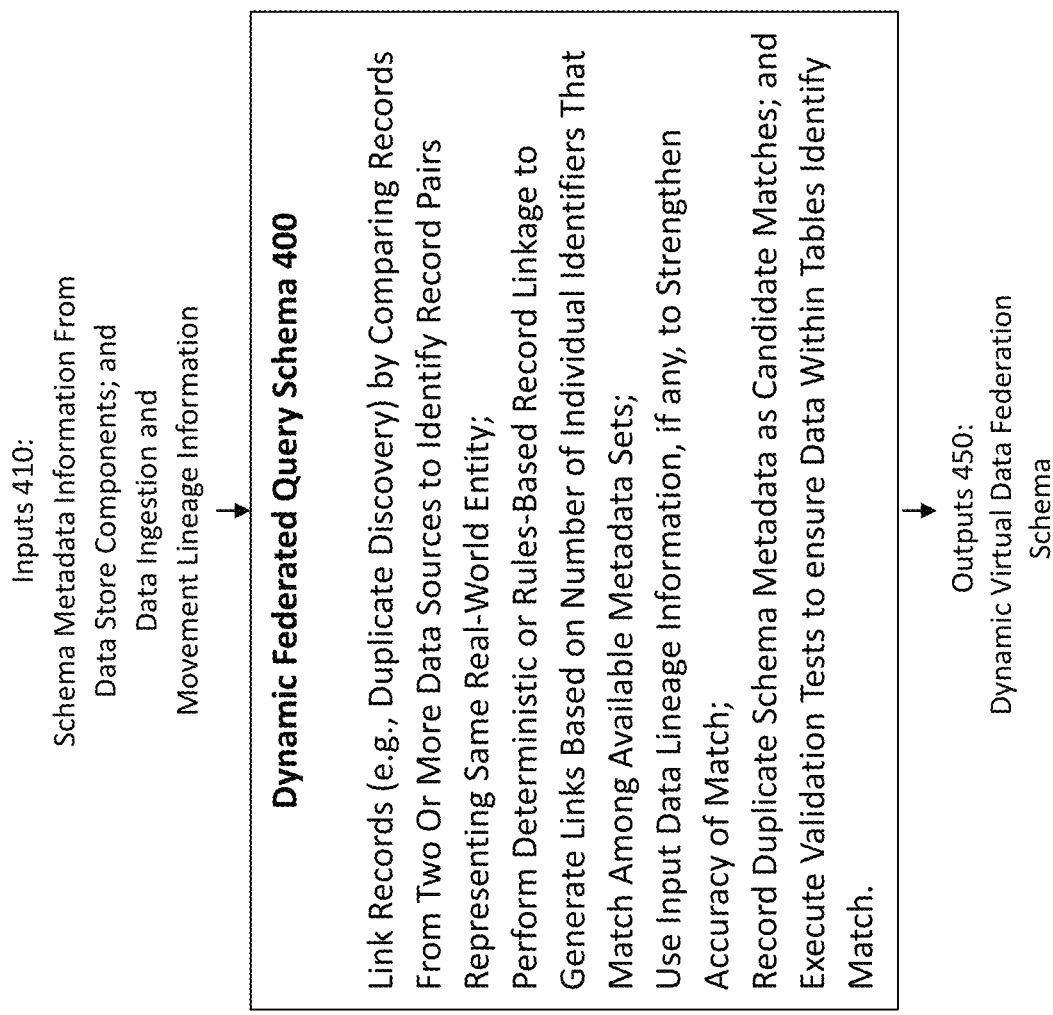
FIG. 4 illustrates the dynamic federated query schema of FIG. 1, according to some embodiments.

FIG. 4 illustrates the dynamic federated query schema 400 of FIG. 1, according to some embodiments. As shown in FIG. 4, the inputs 410 to the dynamic federated query schema 400 comprise schema metadata information from all data store components 160 in the data lake 150, as well as data ingestion and movement lineage information.

The processing of the dynamic federated query schema 400 links records by comparing the records from two or more data sources in an effort to determine which pairs of records represent the same real-world entity (e.g., record linkage may also be defined as the process of discovering duplicate data). Duplicate schema metadata can be recorded as candidate matches. Thereafter, deterministic or rules-based record linkage is performed to generate links based on the number of individual identifiers that match among the available metadata sets.

Input data lineage information is optionally used to strengthen the accuracy of the match.

Duplicate schema metadata is then recorded as candidate matches and validation tests are executed to ensure data within the tables identified the match.

The dynamic federated query schema 400 generates the dynamic virtual data federation schema 450.

Figure 5:
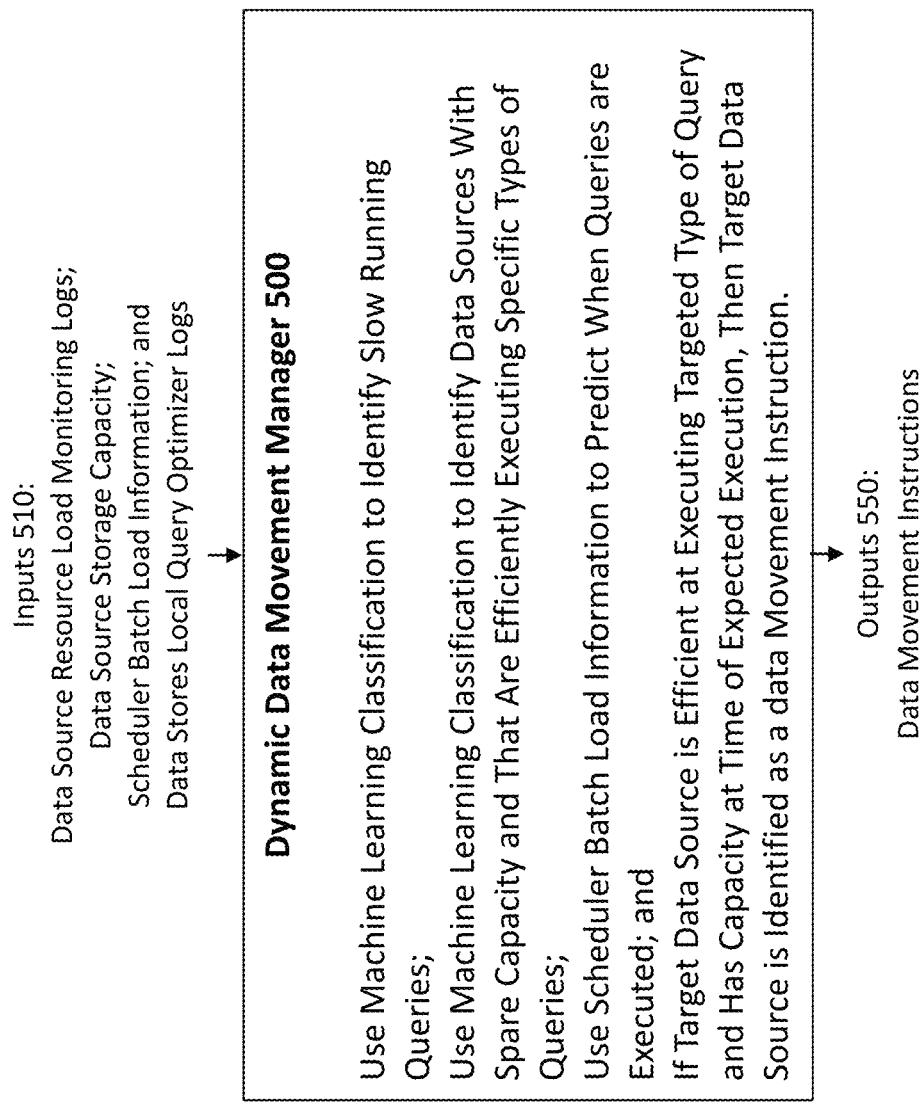
FIG. 5 illustrates the dynamic data movement manager of FIG. 1 in further detail, according to an embodiment.

FIG. 5 illustrates the dynamic data movement manager 500 of FIG. 1 in further detail, according to an embodiment. As shown in FIG. 5, the dynamic data movement manager 500 processes as inputs 510 the data source resource load monitoring logs (e.g., CPU, memory, connection loads) from resource load manager 170; data source storage capacity scheduler batch load information; and logs from the data stores local query optimizers 155.

The processing of the dynamic data movement manager 500 comprises performing a machine learning classification to identify slow running queries, as data used in these queries become candidates to be moved to a different external data source. Machine Learning Classification is also used to identify data sources with spare capacity and that are efficient are executing specific types of queries, as these data sources then become candidates to move data to.

In addition, scheduler batch load information is used by the dynamic data movement manager 500 to predict when the queries will be executed.

If the target data source is efficient at executing the targeted type of query and has capacity at the time of expected execution, then the target data source identified as a data movement instruction.

The dynamic data movement manager 500 generates one or more data movement instructions 550. The dynamic data movement manager 500 takes instructions from the federated optimizer engine 120 to move data and make the moved data available in an external location. In some embodiments, the motivation to move the data is based on a machine learning classification that determines that the new external location has the capacity (for example, based on a predefined capacity criteria at an expected execution time of the particular query) and/or will return the response for data in a more optimal or efficient way, which can be based on, for example, speed, cost or contention capacity (specified, for example, as a predefined efficiency criteria with respect to a query type of the particular query) during a particular day or week.

After a successful data movement to the new target data source, the federated optimizer engine 120 is informed that it can then instruct other components of the solution to use this new information, and make additions to the dynamic federated schema 400.

Figure 6:
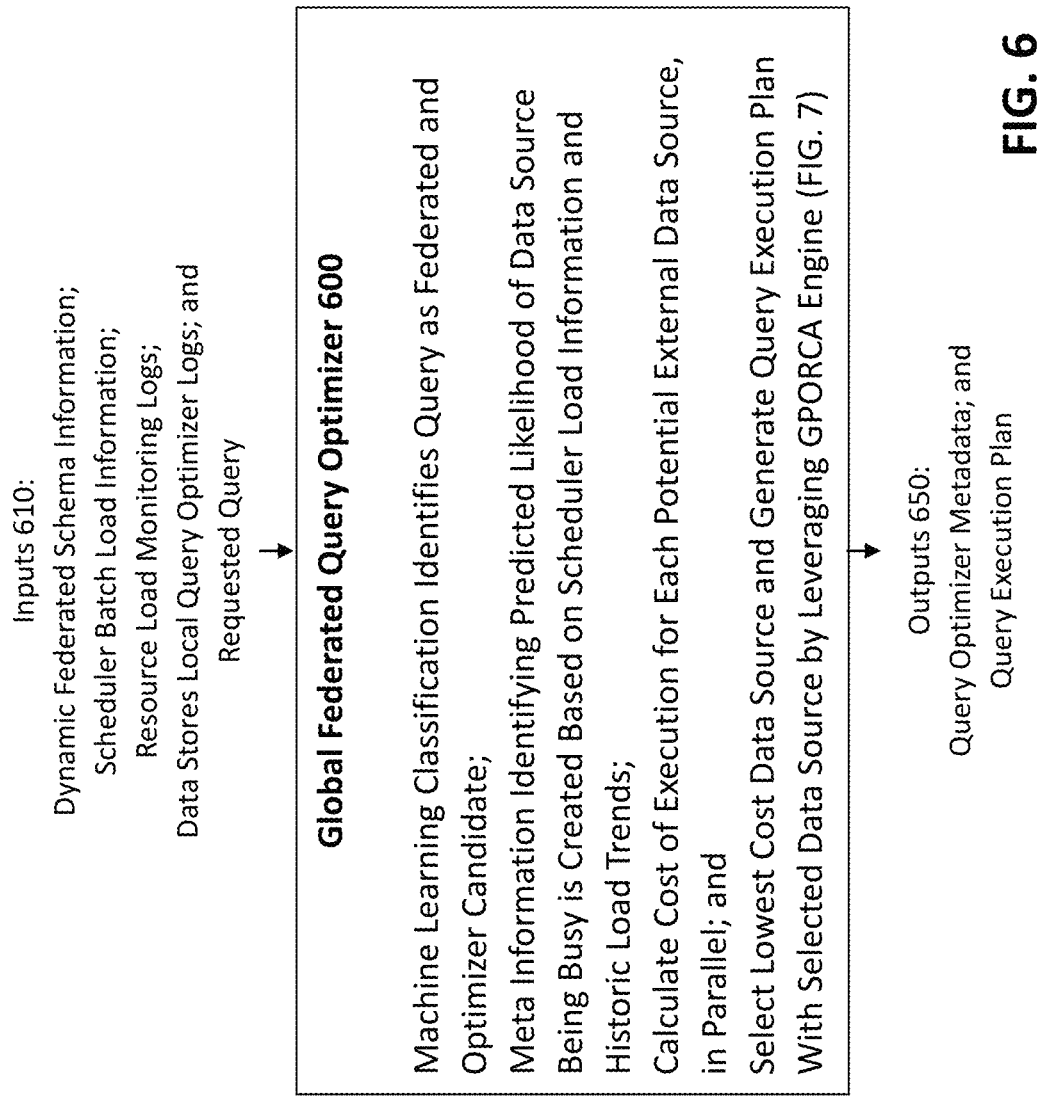
FIG. 6 illustrates the global federated query optimizer of FIG. 1 in further detail, according to one embodiment.

FIG. 6 illustrates the global federated query optimizer 600 of FIG. 1 in further detail, according to an embodiment. As shown in FIG. 6, the exemplary global federated query optimizer 600 processes as inputs 610 dynamic federated schema information, scheduler batch load information, resource load monitoring logs, data stores local query optimizer logs and the requested query.

The processing of the global federated query optimizer 600 comprises performing a machine learning classification to identify the query as federated and an optimizer candidate (e.g., if the dynamic federated schema information 450 has more than one external data source option.

In addition, the exemplary global federated query optimizer 600 creates metadata information identifying the predicted likelihood of the data source being busy, based on scheduler load information and historic load trends. The cost of execution for each potential external data source is then calculated in parallel. In some embodiments, the cost estimation includes the generated metadata that identifies the likelihood of the data source being busy.

The lowest cost data source is then selected by the global federated query optimizer 600 and the query execution plan is generated using known techniques with the selected data source, for example, by leveraging a GPORCA optimizer engine associated with a Greenplum Database, in one or more embodiments discussed further below in conjunction with FIG. 7. The exemplary global federated query optimizer 600 generates outputs 650 comprising the query optimizer metadata, as well as the query execution plan.

In this manner, the global federated query optimizer 600 calculates the cost of execution for each potential external data source in parallel. In some embodiments, the cost is measured as the total expected elapsed time for answering the query within the execution window based on a rule-based machine learning prediction and regression techniques.

The employed machine learning techniques comprise, for example, classifying the database as being busy or available based on scheduler data; and classifying the processing of the query as being slow or quick based on past execution times data. The regression techniques used to predict the execution time are based on similar queries being executed during quiet or busy times.

Figure 7:
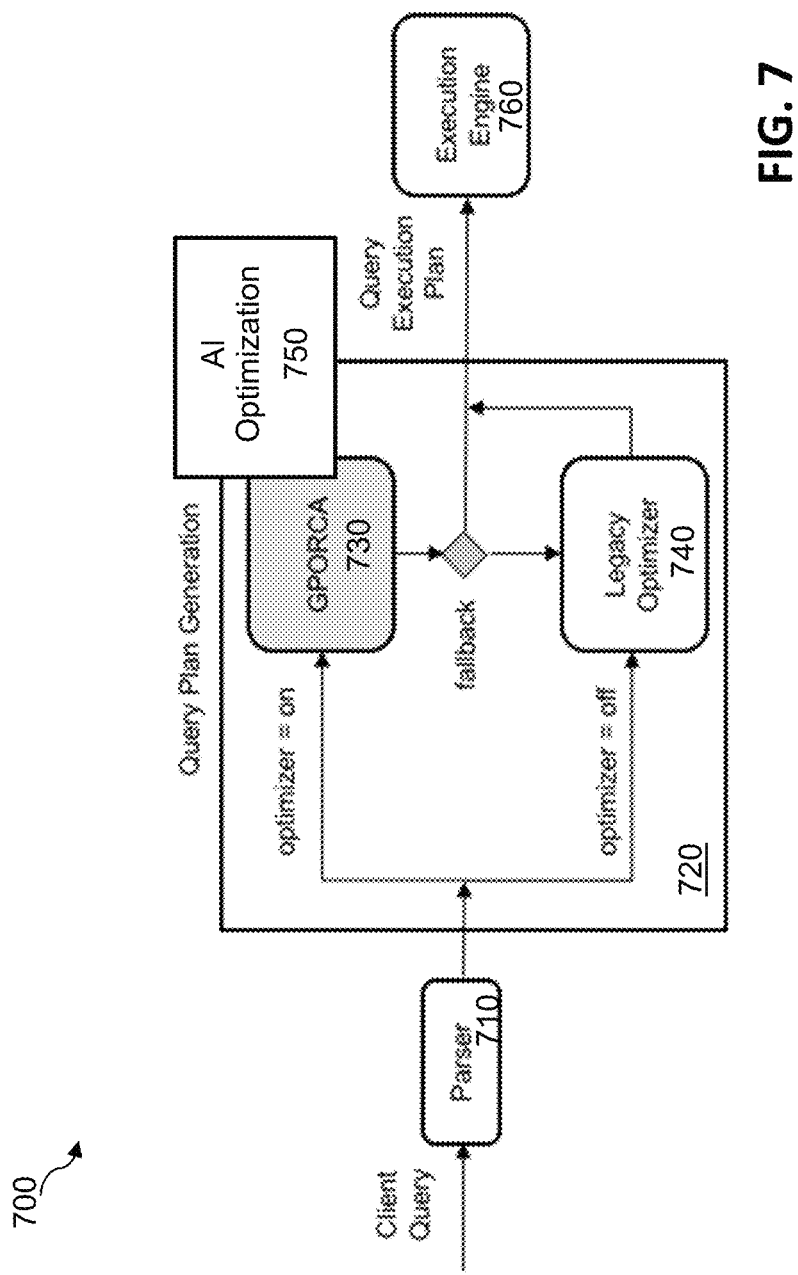
FIG. 7 illustrates an exemplary implementation of a machine learning based query optimizer, according to some embodiments.

FIG. 7 illustrates an exemplary implementation of a machine learning based query optimizer 700, according to some embodiments. As shown in FIG. 7, a client query is applied to a query parser 710 that applies the query to a query plan generation module 720. The query plan generation module 720 applies the query to a legacy optimizer 740 when query optimization is not enabled, or to a GPORCA optimizer 730 associated with a Greenplum Database, when query optimization is enabled. In this manner, the GPORCA optimizer 730 co-exists with the legacy query optimizer 740.

Generally, GPORCA optimizer 730 extends the planning and optimization capabilities of the Greenplum Database legacy optimizer 740. The Greenplum Database uses GPORCA by default to generate a query execution plan for a query when possible. The query execution plan is applied to an execution engine 760 that executes the query.

As shown in FIG. 7, the GPORCA optimizer 730 implements the optimization plan 750 generated in accordance with embodiments of the present disclosure.

In some embodiments, the disclosed machine learning based query optimization techniques move data within federation stores in a predictive fashion and improve the utilization of enterprise data lakes. A query execution plan is generated for a given query by calculating a cost of execution for a plurality of potential target data sources and selecting a target data source for the given query based on the calculated cost of execution.

One or more embodiments of the disclosure provide improved methods and apparatus for machine learning based query optimization. The foregoing applications and associated embodiments should be considered as illustrative only, and numerous other embodiments can be configured using the techniques disclosed herein, in a wide variety of different applications.

It should also be understood that the disclosed federated database query optimization techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for machine learning based query optimization may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the federated database query environment 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of federated database query platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
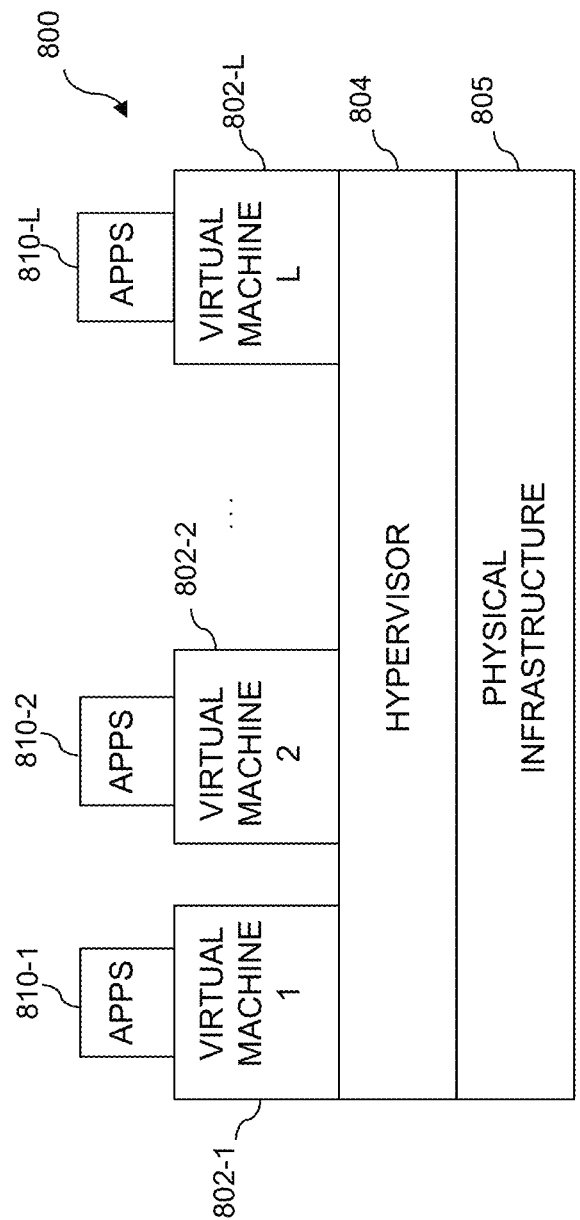
FIG. 8 illustrates an exemplary processing platform that may be used to implement at least a portion of one or more embodiments of the disclosure comprising a cloud infrastructure.

Referring now to FIG. 8, one possible processing platform that may be used to implement at least a portion of one or more embodiments of the disclosure comprises cloud infrastructure 800. The cloud infrastructure 800 in this exemplary processing platform comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

The cloud infrastructure 800 may encompass the entire given system or only portions of that given system, such as one or more of client, servers, controllers, or computing devices in the system.

Although only a single hypervisor 804 is shown in the embodiment of FIG. 8, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 804 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of a federated database query engine in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed federated database query apparatus may each run on a computer, server, storage device or other processing platform element. A given such element may be viewed as an example of what is more generally referred to herein as a "processing device." The cloud infrastructure 800 shown in FIG. 8 may represent at least a portion of one processing platform.

Figure 9:
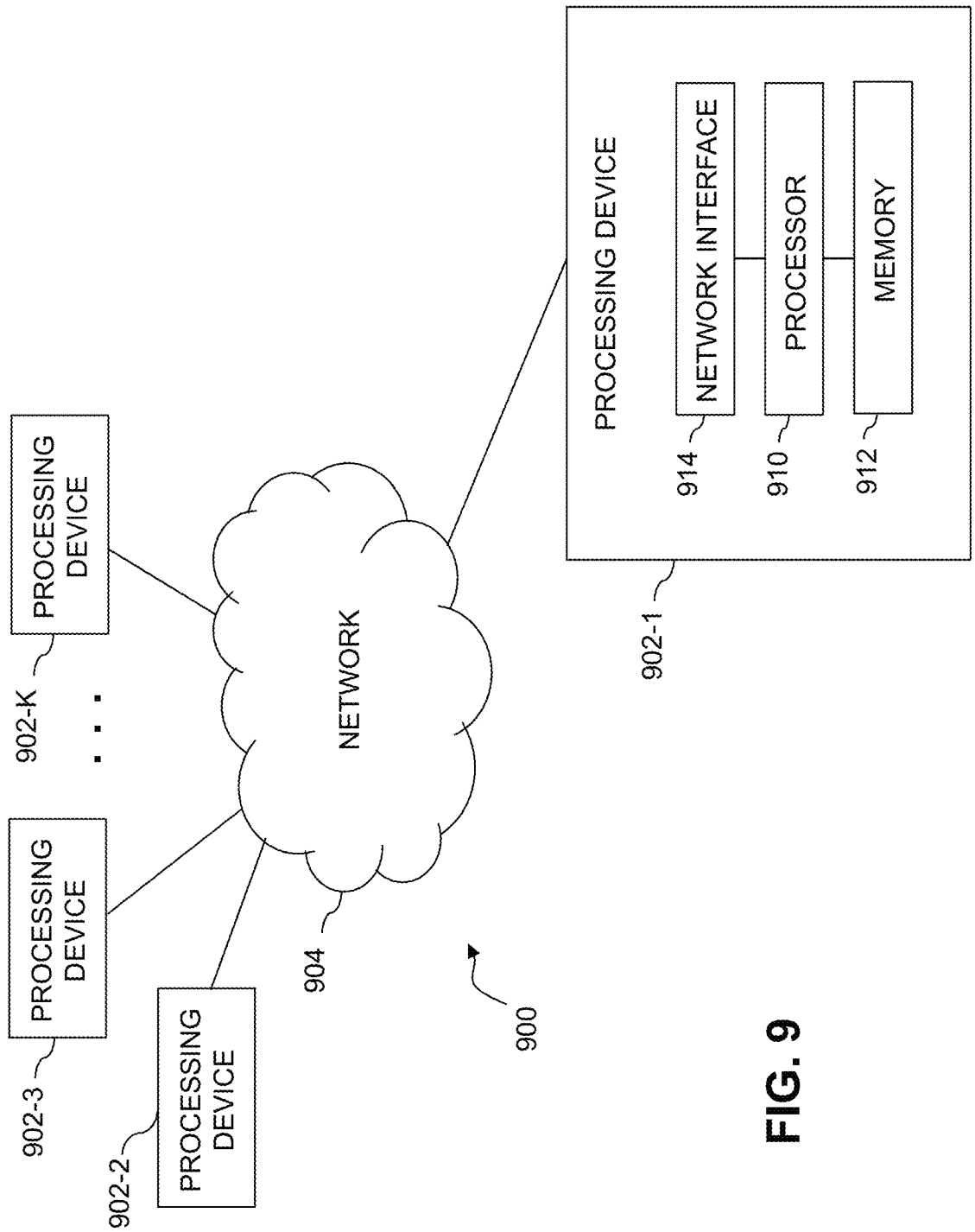
FIG. 9 illustrates another exemplary processing platform that may be used to implement at least a portion of one or more embodiments of the disclosure.

Another example of a processing platform is processing platform 900 shown in FIG. 9. The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in FIGS. 3A, 3B and FIGS. 4 through 6 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining at least one query to be processed in a federated database;
generating at least one predictive data movement instruction to move data to a target data source when the target data source satisfies one or more of a predefined efficiency criterion with respect to a query type of said at least one query and a predefined capacity criteria at an expected execution time of said at least one query; and
generating, using at least one processing device, a query execution plan for said at least one query by calculating a cost of execution for a plurality of potential target data sources and selecting a target data source for said at least one query based on said calculated cost of execution, wherein the cost of execution comprises a predicted likelihood of the target data source being busy based on one or more of scheduler load information and historic load trends.

2. The method of claim 1, further comprising the steps of linking a plurality of records by comparing records from two or more data sources to identify record pairs representing a substantially same real-world entity, and recording duplicate schema metadata as candidate matches.

3. The method of claim 1, wherein said step of generating said at least one predictive data movement instruction further comprises predicting when said at least one query will be executed using scheduler batch load information.

4. The method of claim 1, wherein said step of generating said query execution plan for said at least one query further comprises the step of evaluating whether said at least one query is a federated query.

5. The method of claim 1, wherein said federated database employs a dynamic federated query schema.

6. The method of claim 1, wherein the generating is performed in response to the target data source satisfying one or more of a predefined efficiency criterion with respect to a query type of said at least one query and a predefined capacity criterion at an expected execution time of said at least one query.

7. The method of claim 6, wherein one or more of said predefined efficiency criterion for said target data source and said predefined capacity criteria for said target data source are evaluated using at least one machine learning classification.

8. A computer program product, comprising a non-transitory machine-readable storage medium having encoded therein executable code of one or more software programs, wherein the one or more software programs when executed by at least one processing device perform the following steps:
obtaining at least one query to be processed in a federated database;
generating at least one predictive data movement instruction to move data to a target data source when the target data source satisfies one or more of a predefined efficiency criterion with respect to a query type of said at least one query and a predefined capacity criteria at an expected execution time of said at least one query; and
generating, using at least one processing device, a query execution plan for said at least one query by calculating a cost of execution for a plurality of potential target data sources and selecting a target data source for said at least one query based on said calculated cost of execution, wherein the cost of execution comprises a predicted likelihood of the target data source being busy based on one or more of scheduler load information and historic load trends.

9. The computer program product of claim 8, further comprising the steps of linking a plurality of records by comparing records from two or more data sources to identify record pairs representing a substantially same real-world entity, and recording duplicate schema metadata as candidate matches.

10. The computer program product of claim 8, wherein said step of generating said at least one predictive data movement instruction further comprises predicting when said at least one query will be executed using scheduler batch load information.

11. The computer program product of claim 8, wherein said step of generating said query execution plan for said at least one query further comprises the step of evaluating whether said at least one query is a federated query.

12. The computer program product of claim 8, wherein said federated database employs a dynamic federated query schema.

13. The computer program product of claim 8, wherein the generating is performed in response to the target data source satisfying one or more of a predefined efficiency criterion with respect to a query type of said at least one query and a predefined capacity criteria at an expected execution time of said at least one query.

14. An apparatus, comprising:
a memory; and
at least one processing device, coupled to the memory, operative to implement the following steps:
obtaining at least one query to be processed in a federated database;
generating at least one predictive data movement instruction to move data to a target data source when the target data source satisfies one or more of a predefined efficiency criterion with respect to a query type of said at least one query and a predefined capacity criteria at an expected execution time of said at least one query; and
generating, using at least one processing device, a query execution plan for said at least one query by calculating a cost of execution for a plurality of potential target data sources and selecting a target data source for said at least one query based on said calculated cost of execution, wherein the cost of execution comprises a predicted likelihood of the target data source being busy based on one or more of scheduler load information and historic load trends.

15. The apparatus of claim 14, further comprising the steps of linking a plurality of records by comparing records from two or more data sources to identify record pairs representing a substantially same real-world entity, and recording duplicate schema metadata as candidate matches.

16. The apparatus of claim 14, wherein said step of generating said at least one predictive data movement instruction further comprises predicting when said at least one query will be executed using scheduler batch load information.

17. The apparatus of claim 14, wherein said step of generating said query execution plan for said at least one query further comprises the step of evaluating whether said at least one query is a federated query.

18. The apparatus of claim 14, wherein said federated database employs a dynamic federated query schema.

19. The apparatus of claim 14, wherein the generating is performed in response to the target data source satisfying one or more of a predefined efficiency criterion with respect to a query type of said at least one query and a predefined capacity criterion at an expected execution time of said at least one query.

20. The apparatus of claim 19, wherein one or more of said predefined efficiency criterion for said target data source and said predefined capacity criteria for said target data source are evaluated using at least one machine learning classification.

* * * * *